(12) United States Patent
Zanen

(10) Patent No.: US 6,819,488 B2
(45) Date of Patent: Nov. 16, 2004

(54) DEVICE FOR MAKING 3-D IMAGES

(76) Inventor: Pieter O. Zanen, 209 W. Clinton St., Apt. #1, Ithaca, NY (US) 14850

( * ) Notice: Subject to any disclaimer, the term of this patent is extended or adjusted under 35 U.S.C. 154(b) by 0 days.

(21) Appl. No.: 10/276,848

(22) PCT Filed: May 23, 2001

(86) PCT No.: PCT/US01/16797
§ 371 (c)(1), (2), (4) Date: Apr. 7, 2003

(87) PCT Pub. No.: WO01/91472
PCT Pub. Date: Nov. 29, 2001

(65) Prior Publication Data
US 2004/0125448 A1 Jul. 1, 2004

Related U.S. Application Data

(60) Provisional application No. 60/219,543, filed on Jul. 20, 2000, and provisional application No. 60/206,750, filed on May 24, 2000.

(51) Int. Cl.[7] .................. G20B 27/22; G20B 27/24; H04N 13/02
(52) U.S. Cl. .................. 359/464; 359/462; 359/471; 348/49
(58) Field of Search .................. 359/462, 464, 359/466, 471, 478, 480, 682, 833, 850, 856; 396/24

(56) References Cited

U.S. PATENT DOCUMENTS

| | | | |
|---|---|---|---|
| 2,295,243 A | * 9/1942 | Steinman | 359/462 |
| 3,254,933 A | 6/1966 | Latulippe | 352/57 |
| 4,178,072 A | * 12/1979 | Rogers | 359/462 |
| 4,178,090 A | 12/1979 | Marks et al. | 354/117 |
| 4,436,369 A | 3/1984 | Bukowski | 350/130 |
| 4,523,226 A | 6/1985 | Lipton et al. | 358/88 |
| 4,525,045 A | 6/1985 | Fazekus | 352/57 |
| 4,568,970 A | 2/1986 | Rockstead | 358/91 |
| 4,583,117 A | 4/1986 | Lipton et al. | 358/92 |
| 5,532,777 A | 7/1996 | Zanen | 354/114 |
| 5,828,913 A | 10/1998 | Zanen | 396/324 |
| 5,883,662 A | 3/1999 | Zanen | 348/49 |

FOREIGN PATENT DOCUMENTS

| | | | |
|---|---|---|---|
| DE | 195 28 661 A1 | 12/1995 | G03B/35/10 |
| WO | WO 94/11782 | 5/1994 | |

* cited by examiner

*Primary Examiner*—Audrey Chang
(74) *Attorney, Agent, or Firm*—Brown & Michaels, PC

(57) ABSTRACT

An apparatus for creating three-dimensional images is disclosed. The device has at least four mirrors, arranged in an inner set and an outer set. An enclosure, preferably cylindrical in shape, houses the mirrors and alignment apparatus and can be placed in three different positions. The camera takes two-dimensional photographs or operates in two modes of three-dimensional photography: forward looking and backward looking. This device is preferably attached to a digital camera. The device can also be used when the digital camera is attached to a hand held personal computing device, for example a Handspring™ Visor™ computer made by Handspring, Inc. In a preferred embodiment of the invention, there are six mirrors, including four inner mirrors and one set of outer mirrors.

5 Claims, 6 Drawing Sheets

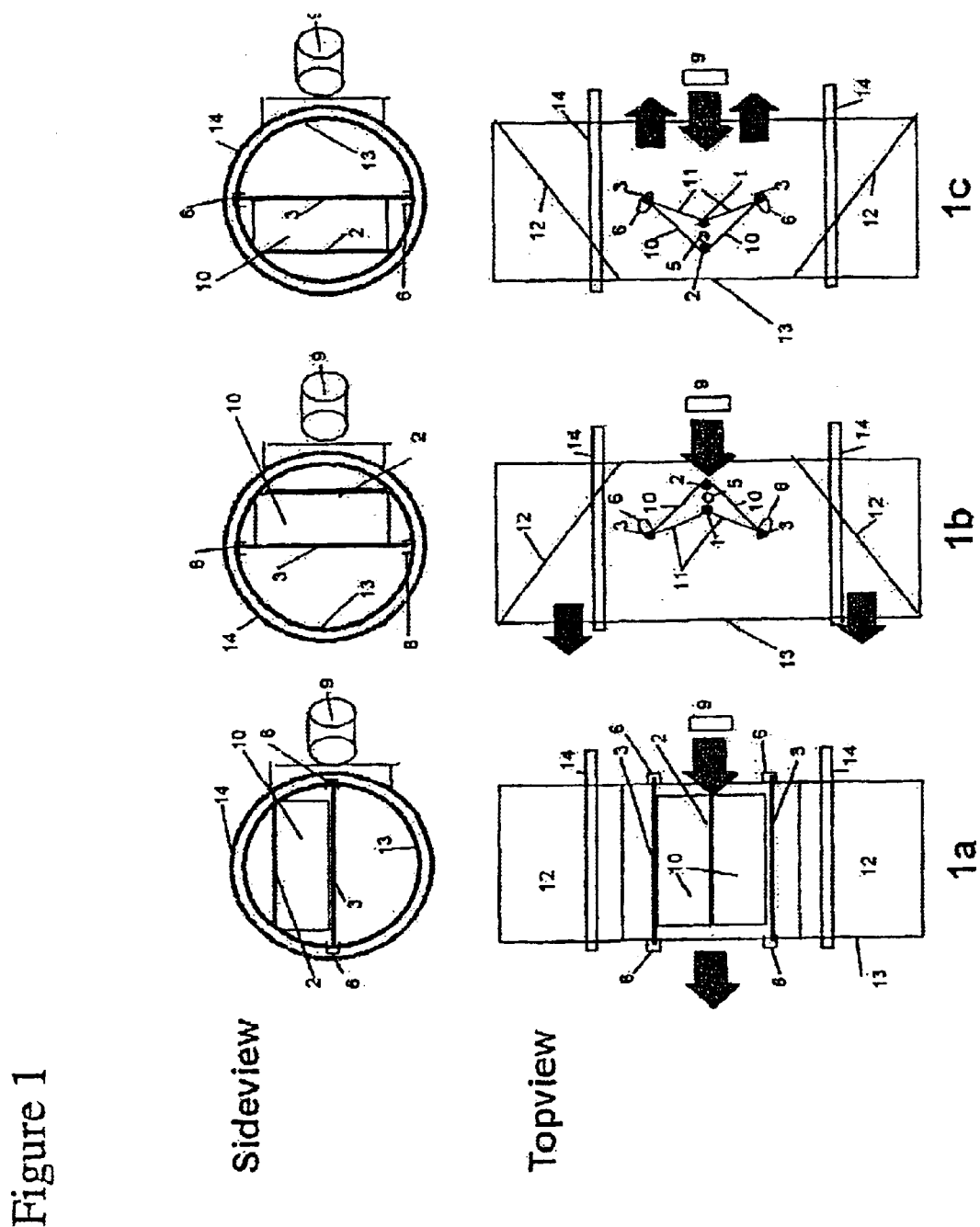

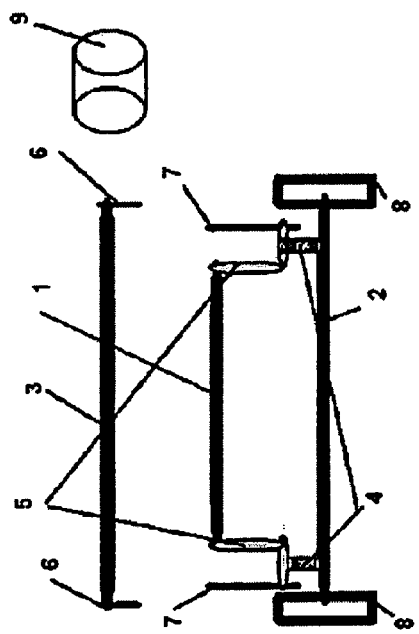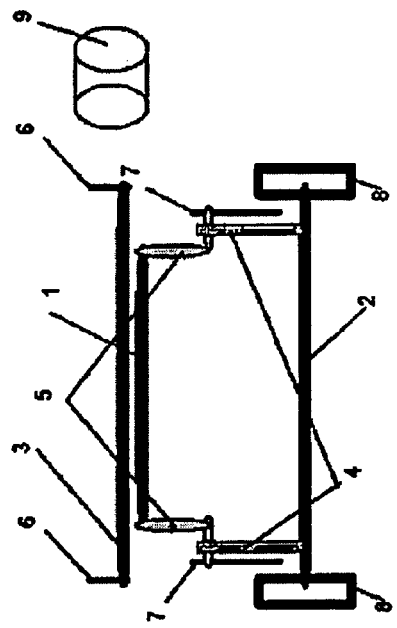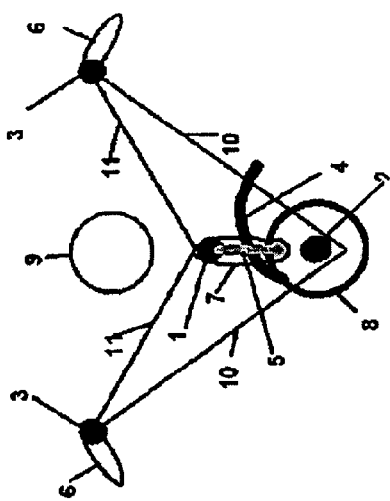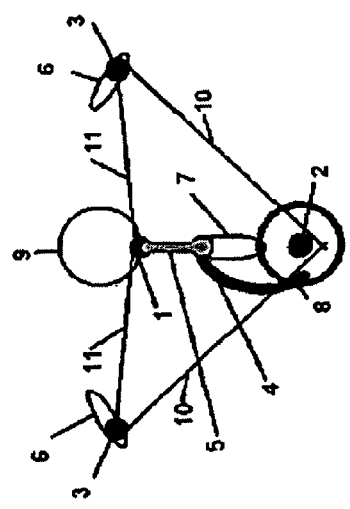

DEVICE FOR MAKING 3-D IMAGES

REFERENCE TO RELATED APPLICATIONS

This application claims an invention which was disclosed in Provisional Application Ser. No. 60/206,750, filed May 24, 2000, entitled "DEVICE FOR MAKING 3-D IMAGES" and in Provisional Application No. 60/219,543, filed Jul. 20, 2000, entitled "DEVICE FOR MAKING 3-D IMAGES". The benefit under 35 USC §119(e) of the United States provisional applications are hereby claimed, and the aforementioned applications are hereby incorporated herein by reference.

BACKGROUND OF THE INVENTION

1. Field of the Invention

The invention pertains to the field of stereographic or "3D" photography and photogrammetry. More particularly, the invention pertains to a single lens instrument which generates three-dimensional models of an image.

2. Description of Related Art

Stereographic photography is the method of producing images which are apparently three-dimensional by recording separate left- and right-eye images. The viewer reconstructs the 3-D image by viewing the two separate 2-D images simultaneously. Stereographic photography has been known since at least the late 19th century, when stereo viewers were a popular parlor accessory.

Such stereo views have historically been created with two lenses on a single camera, spaced apart by approximately the inter-ocular distance of a human head. The Stereo Realist™ series of 35 mm still cameras, popular in the 1950's, are an example of this kind of imaging. Left and right views were recorded simultaneously through two lens/shutter sets on alternate frames of the 35-mm film. The later Nimslo™ system used four lenses for essentially the same approach.

Stereo movies appeared in the 1950's. The images were typically created either using two synchronized cameras, or a two-lens system on a single camera. Similarly, the various Stereo TV systems have typically used two cameras (see Lipton, et al, U.S. Pat. No. 4,583,117) or a single camera with two lenses (Lipton, et al, U.S. Pat. No. 4,523,226).

All of the multiple-camera systems have severe drawbacks, in the added complexity and cost of duplicating the complete camera system and the synchronization of the two separate images (this is especially a problem in film (non-video) applications). In addition, the use of two separate lenses (whether on one camera or two) introduces problems of synchronizing focus and view.

The need for solving this latter problem is real, but not addressed by prior art devices. Simply mounting two cameras side-by-side will allow the taking of the left- and right-eye images, and the cameras can be focused on whatever the subject is (although follow-focus of moving objects is problematic). However, there is more to stereoscopic vision than simply having two eyes. A simple experiment will demonstrate the problem. If one holds up a finger at arms length, and brings it closer and closer to the face, it becomes apparent that your eyes do more than merely focus on the finger as it approaches. You also aim each eye independently; becoming more and more "cross-eyed" as the finger nears the face. Without this adaptation, most 3-D films tended to induce discomfort as the apparent image distance to the view changed, since the camera views would not shift as one's instinct might expect.

In addition, fixed convergence or partially or manually adjustable convergence systems do not address the problem that the overlap of the views must change as the focus and/or focal length of the lens changes. The overlap of the two images should be maximized, especially in systems which digitize the two images and use the information to form a three dimensional picture of the surroundings.

There have been a number of devices aimed at simplifying the stereographic process by allowing use of a single camera to take the two images. Most of these use a number of mirrors or prisms, either in front of the camera lens or between a secondary lens and a pair of primary lenses.

One method, useful only with motion pictures, is to sequentially record the two images on alternate frames of the film or video. For film, a synchronized spinning mirror is used to select the view to be recorded in synch with the film gate or video scan. For such a device, see Latulippe, U.S. Pat. No. 3,254,933. In video, the system electronically selects alternate frames from two sources. This method has several disadvantages, requiring complicated synchronized glasses for viewing and being applicable only to movie or video applications.

The other alternative is to record both images simultaneously on each frame, side-by-side or one above the other. This method is applicable to any form of photography, still or moving, silver image or video. Viewing is simplified, since both images are always present, and the adapter to use a single lens does not need to be synchronized to the film transport or video scan.

Simple prism- or mirror-based stereographic adapters have been available for still cameras for some time. They fit in front of the camera lens in the same manner as an accessory close-up or telephoto adapter. They have no means for adjusting the adapter for convergence or focus as the subject-lens distance changes.

Marks, et al, U.S. Pat. No. 4,178,090, creates vertically displaced left and right images on a single frame using an attachment in front of a single lens. One image is straight-through, with the second being taken through a pair of prisms. An adjustable block in front of the lens is solid glass on the top and reflective on the bottom. Convergence is adjusted as the lens is focused by mechanically coupling a rotation control for the adjustable block and a worm gear rotating the lens focus control. This adjustment is insufficient for true automatic convergence control with focus, as only one of the two views changes angle as the block is rotated.

Bukowski (Optimax III, Inc.) U.S. Pat. No. 4,436,369, shows a mirror-based adapter using two primary lenses with ganged focusing mechanisms. Two pairs of fixed mirrors direct the left and right images to the top and bottom of the film frame. The optical axes of the lenses are parallel and fixed, which means that the convergence or aim point of the two lenses is not changed as the lenses are focused.

Fazekas (Panavision, Inc.) U.S. Pat. No. 4,525,045, also has two primary lenses and two pairs of fixed mirrors/prisms. A "horizon adjustment" is provided to allow the cameraman to move one lens to compensate for the vertical displacement of the two lenses, but the optical axes of the lenses are fixed and parallel.

Rockstead, U.S. Pat. No. 4,568,970, uses an adapter which fits in front of the lens of a television camera. Pairs of mirrors or prisms are used to create the pair of images on the video frame, and a similar device in front of the viewer's eyes reconstructs the two images back into a 3-D single image. A knob allows the operator to manually adjust the convergence of optical axes of the mirrors/prisms to create the two side-by-side images.

U.S. Patent Nos. 5,532,777, 5,828,913, and 5,883,662 by the present inventor disclose a device and method of for generating a pair of images of a subject, left and right, in which the overlap of the images is maximized by adjusting the convergence of the image-collecting means in response to the distance from the subject. An adapter having a set of four mirrors in two pairs is located in front of a camera lens. The centers of the four mirrors are all aligned on a common centerline, with the outer two mirrors facing generally outward along the optical axis of the lens and the inner two mirrors facing generally inward into the lens. The centers of the outer two mirrors are spaced apart by an appropriate interocular distance. The two inside mirrors are together large enough to cover the complete viewing area of the lens, each taking half of the lens viewing area. The two outside mirrors are bigger than the inside pair and large enough to cover the viewing area of the inside pair to avoid viewing area reduction. The convergence of the two outer mirrors is adjustable by swiveling them simultaneously and equally about their centerlines with a ganging mechanism. The two center mirrors may be fixed, or could be adjustable by being swiveled so that one side of each remains in tight contact with the other along the optical axis of the camera lens, and each makes a 45° or lesser angle to the optical axis.

SUMMARY OF THE INVENTION

An apparatus for creating three-dimensional images is disclosed. The device has at least four mirrors, arranged in an inner set and an outer set. An enclosure, preferably cylindrical in shape, houses the mirrors and alignment apparatus and can be placed in three different positions. The camera takes two-dimensional photographs or operates in two modes of three-dimensional photography: forward looking and backward looking. This device is preferably attached to a digital camera. The device can also be used when the digital camera is attached to a hand held personal computing device (PDA). In a preferred embodiment of the invention, there are six mirrors, including four inner mirrors and one set of outer mirrors.

BRIEF DESCRIPTION OF THE DRAWINGS

FIG. 1a shows a first configuration of the device of the present invention, which creates regular forward two-dimensional viewing.

FIG. 1b shows a second configuration of the device of the present invention, which creates forward three-dimensional viewing.

FIG. 1c shows a third configuration of the device of the present invention, which creates backward three-dimensional viewing.

FIG. 2a shows a frontal view with detail of mechanism to adjust angle between mirror sets. Mirrors are moved out of the view of the lens for 2D viewing as shown in FIG. 1a.

FIGS. 3a and 3b show a frontal view with detail of mechanism to adjust angle between mirror sets.

FIGS. 3c and 3d show a side view of FIG. 3a with detail of mechanism to adjust angle between mirror sets.

DETAILED DESCRIPTION OF THE INVENTION

Figure 2A:
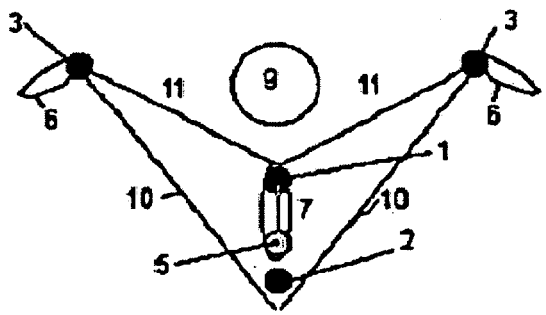

Referring to FIGS. 1–4, an instrument using a single lens for generation of three-dimensional models is shown. One example of a type of three-dimensional model, which could be created by the device of the invention, is a model of facial features. Four of the mirrors (10) and (11) are in front of a camera lens (9). The whole mechanism is preferably housed in a tube (13) that is supported by an enclosure (14), so it can freely rotate as a result.

The inner mirrors (10) and (11) can have the following orientations relative to the lens; a) out of the way of the lens and parallel to the optical axis to allow for regular forward two-dimensional viewing (FIG. 1a, 2a, 3a, 4a), b) with mirror pair (10) facing the lens to allow for forward three-dimensional viewing as described in U.S. Pat. No. 5,532,777 (FIG. 1b, 2b, 3b, 4b), and c) with mirror pair (11) facing the lens for backward three-dimensional viewing as described in Goshtasby & Gruver (Design of a Single-Lens Stereo Camera System. *Pattern Recognition*, 1993, Vol. 26 (6): 923–937) (FIG. 1c, 2c, 4c).

The outer pair of mirrors (12) is aimed outward along the optical axis of the lens (9). The outer pair of mirrors (12) are aimed so that the left and right views converge to preferably overlap at about 50 cm in front of the lens (9). The inner pairs of mirrors (10) and (11) are aimed so that the reflecting surfaces of pair (10) make an angle of 90° or less and the reflecting inner surface of pair (11) makes an angle of 120° or more.

The angle between the mirrors of the inner pair can be made variable (see FIG. 2) so that the plane where the left and right view overlap in front (FIG. 1b) or behind the lens (FIG. 1c) are adjustable. The mechanism to adjust the mirror sets (10) and (11) secures that both mirror set (10) and (11) change angles equally but in opposite directions relative to the optical axis of the lens as described in U.S. Pat. No. 5,532,777.

Mirror set (10) is joined on the inner side of the mirrors with axle hinge (2), whereas the outer ends of mirror set (10) are supported by axle hinges (3). Mirror set (11) is joined on the inner side with axle hinge (1), whereas the outer ends of mirror set (11) are supported by axle hinge (3). Guides (5) on the ends of axle hinge (1) are supported by ganging means (7), which keeps the guides (5) aligned in a plane through the optical axis of the lens (9). A unit including a control wheel (8) and a cam (4) all sitting on axle hinge (2) controls the position of guides (5) so that the angle between the two mirror sets (10) and (11) and convergence can be varied. Ganging means (6) support axle hinges (3).

Figure 2B:
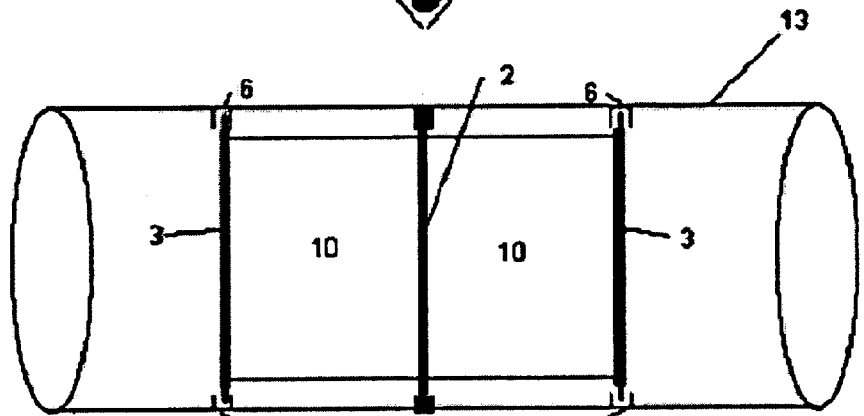
FIG. 2b shows a frontal view of mirrors used for forward 3D viewing, as shown in FIG. 1b.
Figure 2C:
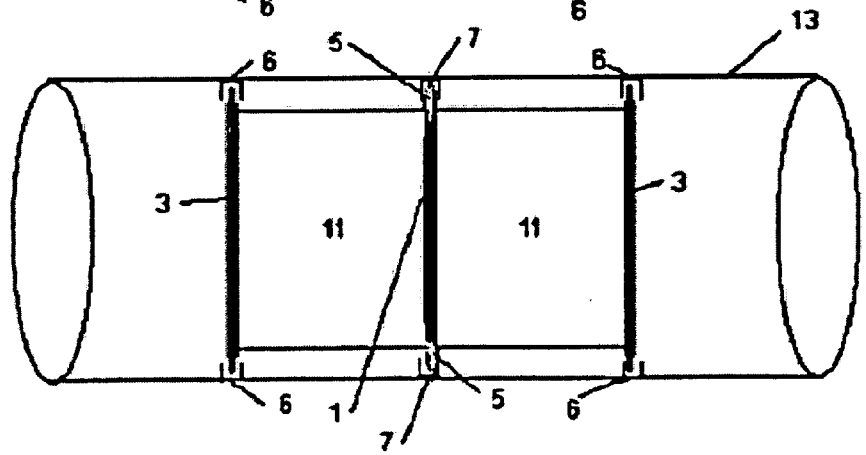
FIG. 2c shows a frontal view of mirrors used for backward 3D viewing, as shown in FIG. 1c.
Figure 4:
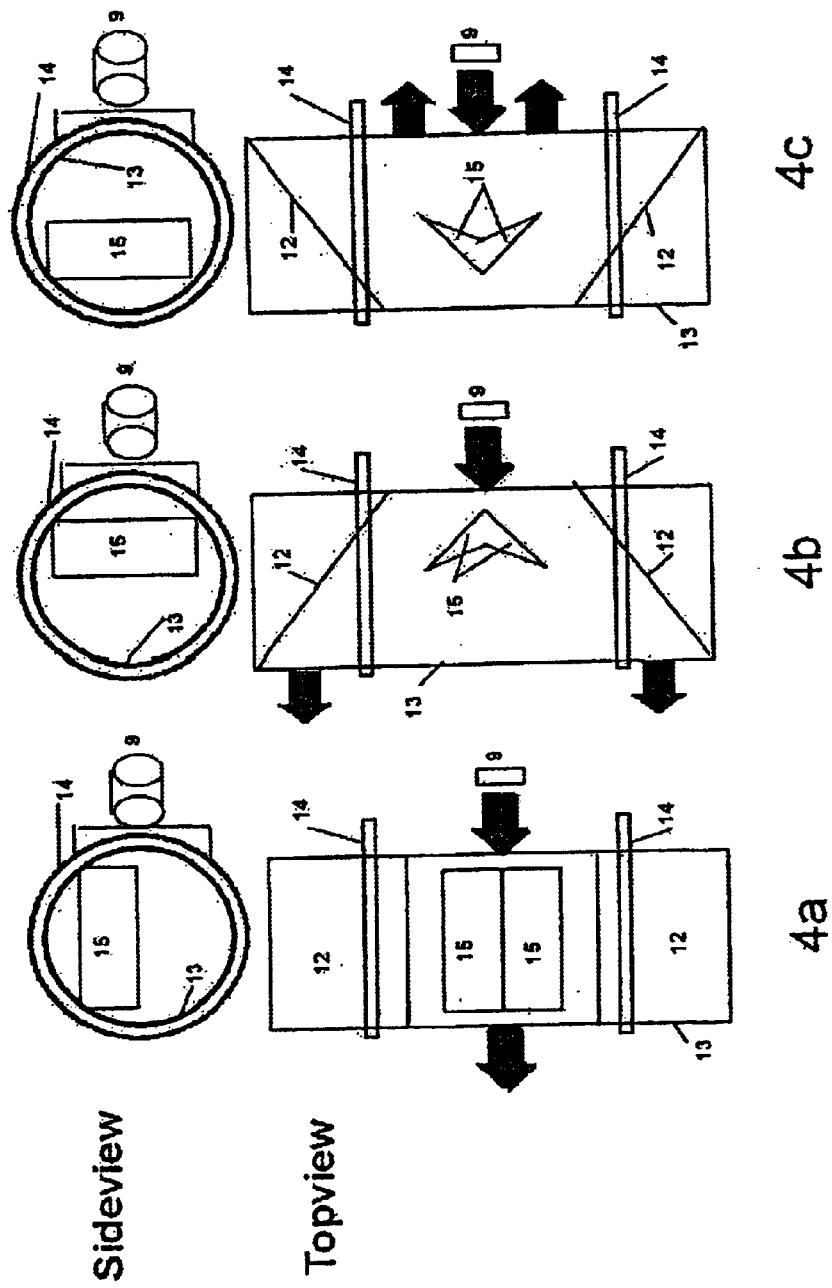
FIGS. 4a–4c show another embodiment of the invention, in which the inner set comprises a set of two wedge-shaped mirrors.

In FIG. 2a, a frontal view includes the detail of a mechanism to adjust the angle between mirror sets. Mirrors (10) and (11) are moved out of the view of the lens for 2D viewing as shown in FIG. 1a. The cylindrical housing (13) is not shown. In FIG. 2b, a frontal view of the mirrors (10) used for forward 3D viewing as in FIG. 1b are shown. In FIG. 2c, a frontal view of the mirrors (11) used for backward 3D viewing as in FIG. 1c are shown. For clarity, the control wheel (8) and cam (4) are not shown in FIG. 2a–2c.

In FIG. 3a, a frontal view includes the detail of a mechanism to adjust the angle between mirror sets. Mirrors are positioned out of the view of the lens for 2D viewing as shown in FIG. 1a. Control wheel (8) pulls mirror set (11) closer to mirror set (10) via cam (4). In FIG. 3b, a frontal view includes the details of a mechanism to adjust the angle between mirror sets. Mirrors are positioned as shown in FIG. 1b. Control wheel (8) pushes mirror set (11) away from mirror set (10) via cam (4). FIG. 3c shows a side view of FIG. 3a with detail of mechanism to adjust angle between mirror sets. Both axle (1) via guide (5) in ganging means (7) and axles (3) in ganging means (6) are free to move, whereas axle (2) with control wheels (8) and cams (4) has a fixed position. FIG. 3d shows a side view of FIG. 3b with detail of mechanism to adjust angle between mirror sets. FIG. 3d is similar to FIG. 3c, but the control mechanism is set to maximum angles between mirror sets (10) and (11).

In another embodiment of the invention, the apparatus of the invention has a set of four mirrors, as shown in FIGS. 4a–4c. Two of the mirrors are wedge-shaped (15) and found in front of the camera lens (9). The position of the wedge-shaped pair (15) does not obstruct the view of the lens for 2D viewing (FIG. 4a). The mirror side reflecting the three-dimensional forward view (FIG. 4b) encloses an angle of about 90° whereby both the left and right view overlap at a distance away from the lens sufficient to enclose a face of someone standing approximately one meter away from a person holding the device. The mirror side reflecting the three-dimensional backward view (FIG. 4c) encloses an angle of about 120° whereby both the left and right view overlap at a distance away from the lens sufficient to enclose the face of a person holding the device.

Figure 5:
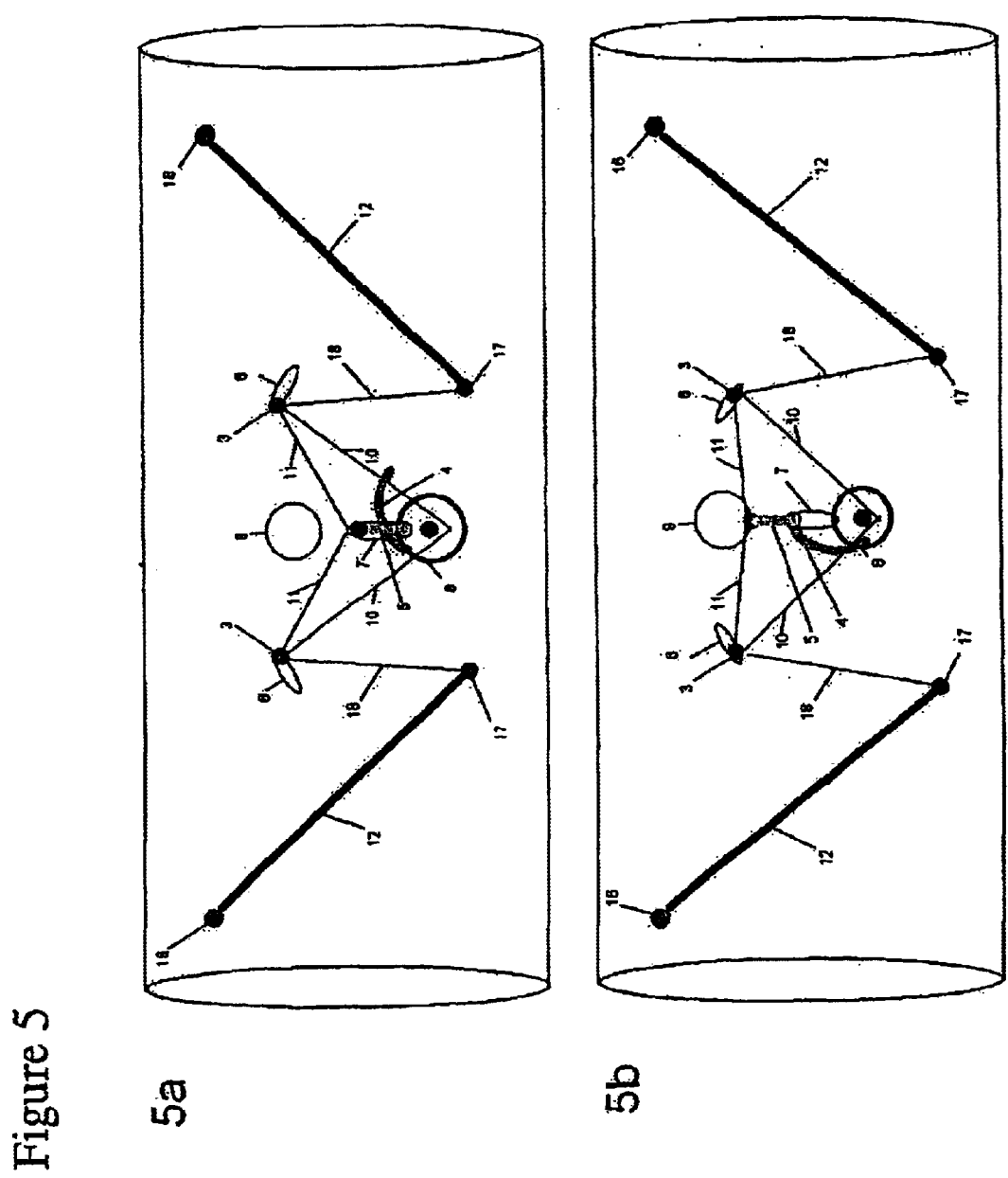
FIG. 5a shows a coupling of the outer mirrors to the inner mirror mechanism so that the range is adjusted for a distant setting.
FIG. 5b shows a coupling of the outer mirrors to the inner mirror mechanism so that the range is adjusted for a close setting.

Referring also to FIGS. 5a and 5b, the apparatus couples the outer mirrors (12) to the inner mirror mechanism so that the adjustment range can be extended. FIG. 5a shows an example of an adjustment for a distant setting, while FIG. 5b shows an adjustment for a close by setting. Fixed axis (16) is attached to the outer edge of the outer mirror (12) so that the mirror (12) can rotate around that axis parallel to the inner mirror (10). A linkage (17) links a control arm (18) attached to the inner edge of the outer mirror (12) so that the mirror (12) moves together with the inner mirror (10) The control arm (18) is also attached to free moving axis (3).

Figure 6:
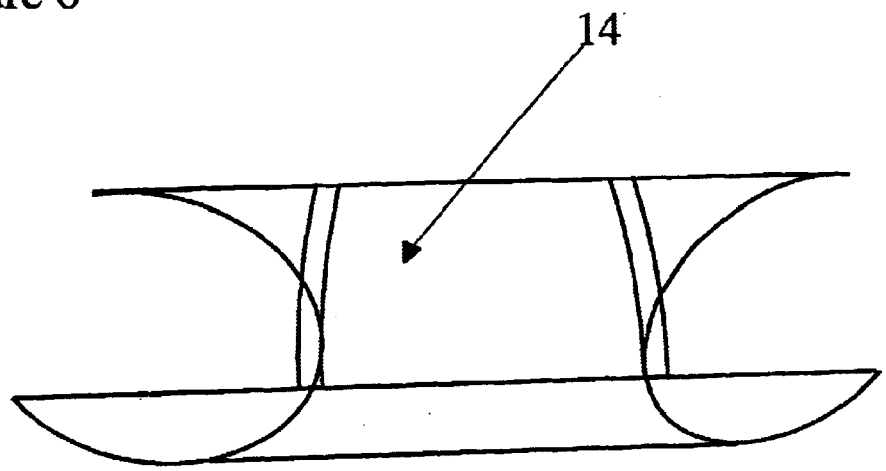
FIG. 6 shows an example of an enclosure that houses the mirrors and is rotatable.

Referring to FIG. 6, an enclosure (14), preferably cylindrical in shape, encloses the mirror apparatus. The enclosure is preferably made of plexiglass, but can be manufactured out of any material, preferably non-breakable. The enclosure (14) allows the device to be freely rotatable, allowing the mirror set to have three positions. Depending on its position, the device can create two dimensional images and both forward-looking and backward-looking three-dimensional images. If the device is attached to a digital camera (possibly attached to a PDA - see FIG. 7), for example, the enclosure (14) allows for the entire device to move out of the way when not in use. The enclosure (14) is capable of rotating 180°. This creates a backward-looking view, and a user is able to take a three-dimensional picture of himself.

Figure 7:
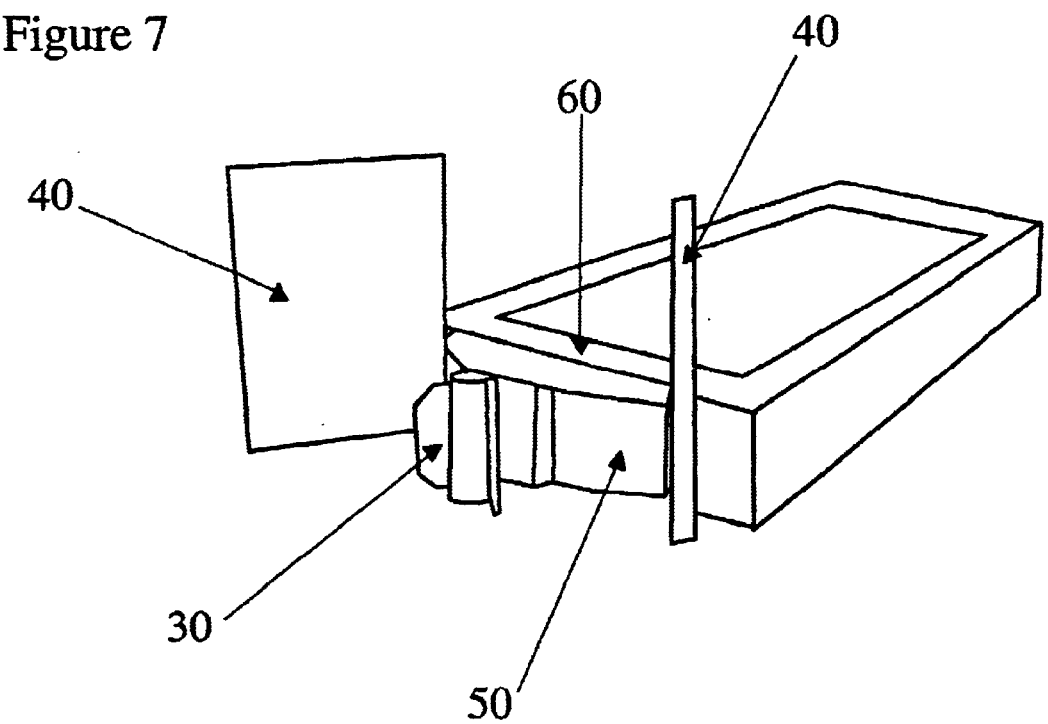
FIG. 7 shows a the invention as used with a personal digital assistant (PDA).

Referring to FIG. 7, an example of the use of the present invention is shown. The two inner mirrors (30) and the two outer mirrors (40) are connected to a digital camera (50), which is an extension of a hand held personal computing device or Personal Digital Assistant (PDA) (60), for example a Handspring™ Visor™ computer made by Handspring, Inc. or a Palm® Pilot computer made by Palm Computing, Inc.

The device of the present invention allows for the digital camera to take three different types of images: two dimensional, three-dimensional forward-facing, and three-dimensional backward-facing. One type of image which may be taken is of an individual's facial features. For example, the device could be utilized for three-dimensional face recognition. The backward-facing option allows the user of the hand-held personal computing device (60) to take a picture of his own face with the device. The enclosure (14) shown in FIG. 6 is also a part of the device, but has not been included here merely to provide a better view of the mirror configuration in relation to the digital camera (50) and hand held personal computing device (60).

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An instrument for generation of three-dimensional images using a single lens comprising:
    a) a first inner pair of mirrors in front of the lens wherein said first inner pair of mirrors is joined along an optical axis of the lens such that a reflecting surface of said first inner pair of mirrors creates an angle less or equal to 90°;
    b) a second inner pair of mirrors in front of the lens wherein said second inner pair of mirrors is joined along the optical axis of the lens such that a reflecting surface of said second inner pair of mirrors creates an angle greater or equal to 120°;
    c) an outer pair of mirrors, aligned such that an image reflecting from the outer pair of mirrors is reflected onto the first pair of inner mirrors; and
    d) a housing enclosing both inner pairs of mirrors and the outer pair of mirrors such that said housing allows the instrument to rotate, said housing being rotatable at least 180° along an axis perpendicular to the optical axis of the lens, to at least three rotational positions, such that:
       in a first position the first inner pair and second inner pair of mirrors are out of a field of view of the lens, such that a two-dimensional image is created by the lens,
       in a second position the first inner pair of mirrors faces the lens such that a forward three-dimensional image is created, and
       in a third position the second inner pair of mirrors faces the lens such that a backward three-dimensional model is created.

2. The instrument of claim 1, wherein the said first inner pair of mirrors and said second inner pair of mirrors are fixed in angular relationship.

3. The instrument of claim 2, in which the inner mirrors comprise
    a wedge-shaped inner pair of mirrors in front of the lens wherein said wedge-shaped pair of mirrors have a first side and a second side such that a reflecting surface of said first side creates an angle approximately 90° and a reflecting surface of said second side creates an angle approximately 120°.

4. The instrument of claim 1, wherein:
    an inner edge of each of the first inner pair of mirrors is joined by a first hinge;
    an inner edge of each of the second inner pair of mirrors is joined by a second hinge; and
    an outer edge of each of said first inner pair of mirrors and an outer edge of said second inner pair of mirrors are joined by third hinges;
    such that when the second hinge is moved along the optical axis of the lens relative to the first hinge, the first inner pair of mirrors changes angles in an equal but opposite direction relative to the second inner pair of mirrors.

5. The instrument of claim 4, further comprising:

a control wheel having an axis of rotation concentric with the first hinge;

a cam coupled to the control wheel and to the second hinge;

such that when the control wheel is rotated, the cam moves the second hinge linearly along the optical axis of the lens.

* * * * *